United States Patent [19]

Inagaki et al.

[11] Patent Number: 5,592,324
[45] Date of Patent: Jan. 7, 1997

[54] CYLINDRICAL INNER SURFACE SCANNER AND IMAGING CONTROL METHOD IN CYLINDRICAL INNER SURFACE SCANNER

[75] Inventors: Yukihiko Inagaki, Kamikyo-ku; Hideki Matsuura, Minami-ku, both of Japan

[73] Assignee: Dainippon Screen Mfg. Co., Ltd., Japan

[21] Appl. No.: 310,716

[22] Filed: Sep. 22, 1994

[30] Foreign Application Priority Data

Sep. 22, 1993 [JP] Japan .................... 5-259036

[51] Int. Cl.$^6$ .................................. G02B 26/08
[52] U.S. Cl. ................ 359/210; 359/212; 359/823; 250/234
[58] Field of Search ................ 359/196–199, 359/201–203, 212–215, 220, 223, 226, 209–211, 738–740, 811, 813, 819, 822–826, 900; 347/256–259, 247; 250/234–236, 201.2, 201.4; 358/474, 491, 497, 493

[56] References Cited

U.S. PATENT DOCUMENTS 4,994,678  2/1991  Sasaki ........................ 356/381
5,025,157  6/1991  Katsuaki ..................... 250/327.2

FOREIGN PATENT DOCUMENTS 62-19724   4/1987  Japan .
63-158580  7/1988  Japan .
5-27190    2/1993  Japan .

*Primary Examiner*—James Phan
*Attorney, Agent, or Firm*—Ostrolenk, Faber, Gerb & Soffen, LLP

[57] ABSTRACT

A holder (10) is movably inserted in a through hole (22A) of a base portion (22) of a scanning head which is movable along a central axis (27) of a cylindrical inner surface drum, through a ball guide (13). Projections (25, 10B) of the base portion (22) and the holder (10) are coupled with each other by a ball screw (15). Further, a lens holder (2) is inserted/supported in a through hole (10E), and an imaging lens (1) is fixedly provided in the lens holder (2). A pulse motor (24) which is coupled to the ball screw (15) is rotated by the number of pulses as applied. As the result, the holder (10) and the lens holder (2) are moved toward the central axis (27), followed by movement of an imaging position of the lens (1). An iris (16) is fixedly provided on an incident side end surface of the lens holder (2) adjacently to the lens (1), so that its stop diameter is varied by a DC motor (18)

9 Claims, 20 Drawing Sheets ized as inventor
CYLINDRICAL INNER SURFACE SCANNER AND IMAGING CONTROL METHOD IN CYLINDRICAL INNER SURFACE SCANNER

BACKGROUND OF THE INVENTION

1. Field of the Invention

The present invention relates to a cylindrical inner surface scanner which is applied to CTP (computer to plate: direct prepress system) for printing/prepressing. The "CTP" is an apparatus for preparing a printing plate by directly forming halftone dot images on a plate material on the basis of digital image signals integrating characters, figures and images, without forming a halftone dot film.

2. Background of the Invention

As known in the art, a cylindrical inner surface scanner is an apparatus having a cylindrical inner surface drum, a photosensitive material which is mounted on the inner surface of the drum, a scanning head which is moved in a subscanning direction along a central axis of the drum, a deflector for main scanning which is arranged on the scanning head and rotated about the central axis, and an imaging lens, and is adapted to deflect a light beam which is modulated by an image signal or the like by the deflector through the aforementioned lens, thereby scanning/exposing the photosensitive material with the beam in a main scanning direction. A more detailed structure of such an apparatus is disclosed in Japanese Patent Laying-Open Gazette No. 63-158580 (1988), Japanese Patent Publication No. 62-19724 (1987), or Japanese Patent Laying-Open Gazette No. 5-27190 (1993) or No. 5-5846 (1993), for example. Recently, such a cylindrical inner surface scanner is applied to a direct prepress system called CTP. The CTP is an apparatus for preparing a printing plate by directly forming halftone dot images on a plate material on the basis of digital image signals integrating characters, figures and images, without forming a halftone dot film.

In the CTP, a plate material is directly scanned with a light beam to be exposed, as hereinabove described. Such plate materials include some types, and thicknesses (hereinafter referred to as plate thicknesses) of actually employed plate materials are over a range of 150 μm to 300 μm. Even if an imaging position by an imaging lens is set on a certain type of plate material, therefore, this imaging position is not located on a newly employed plate material if this plate material is of a different type, due to difference between thicknesses of the plate materials.

FIG. 20 typically shows this state. Referring to FIG. 20, an imaging position by an imaging lens is set on a plate material 61 having a plate thickness T. When the imaging lens set in this state is employed as such to scan a new plate material 62 of a plate thickness T' (T'>T) with a light beam IL, an image of an out-of-focus state is inconveniently formed on the new plate material 62, and prescribed resolution cannot be obtained. Referring to FIG. 20, numeral 32 denotes an inner surface of a cylindrical inner surface drum, on which the plate materials 61 and 62 are mounted by vacuum mounting or the like.

Thus, it is necessary to control the position of an imaging lens so that its imaging position is regularly located on a plate material regardless of the type of the plate material. However, there has been implemented no CTP having means which can solve such a problem, since this problem has not been generally recognized in the CTP.

On the other hand, it may be necessary to set resolution of the same type of plate material at various values in response to halftone dot images. Thus, also strongly awaited is implementation of a cylindrical inner surface scanner for CTP having a function which can implement resolution values required under such circumstances one by one. In practice, however, there has been developed/implemented no cylindrical inner surface scanner also having such a function.

SUMMARY OF THE INVENTION

The present invention has been first proposed in consideration of the aforementioned problems. In order to satisfy the aforementioned requirements, the present invention has the following objects:

(1) To provide a cylindrical inner surface scanner with a lens position control function which can regularly image a light beam on an exposure surface of a plate material regardless of the type and the thickness of the plate material.

(2) To make such a function (1) electrically controllable.

(3) To implement such a function (1) particularly in a scanning head of a cylindrical inner surface scanner.

(4) To make an imaging position controllable every plate thickness on the basis of a time when a light beam is imaged on the inner surface of the cylindrical inner surface with reference to such a function (1).

(5) To provide the cylindrical inner surface scanner also with a control function which can vary resolution to various values as required in addition to such a function (1).

(6) To make such a function (5) electrically controllable.

(7) To implement such a function (5) in the scanning head of the cylindrical inner surface scanner.

(8) In addition, to provide the cylindrical inner surface scanner also with a function of scanning an image on the exposure surface of the plate material in parallel with a main scanning line.

(9) To implement such a function (8) in the scanning head.

A cylindrical inner surface scanner according to the present invention is adapted to scan a plate material which is mounted on an inner surface of a cylindrical inner surface drum having a hollow shape provided with a cylindrical inner surface in a main scanning direction with a light beam incident upon the cylindrical inner surface drum by a deflector mounted on a scanning head which is movable in a subscanning direction being parallel to a central axis of the cylindrical inner surface drum for exposing the plate material thereby producing a printing plate, and comprises:

(a) means for inputting a command signal providing a plate thickness of the plate material actually mounted on the inner surface, and (b) means which is arranged on an optical path of the light beam incident upon the deflector and movable in the subscanning direction integrally with the deflector, for imaging the incident light beam on an exposure surface of the plate material on the basis of the command signal.

An imaging control method in a cylindrical inner surface scanner according to the present invention is adapted to scan a plate material which is mounted on an inner surface of an cylindrical inner surface drum having a hollow shape provided with a cylindrical inner surface in a main scanning direction with a light beam incident upon the cylindrical inner surface drum by a deflector mounted on a scanning head which is movable in a subscanning direction being parallel to a central axis of the cylindrical inner surface drum for exposing the plate material thereby producing a printing plate, and comprises:

(a) a step of providing the scanning head with a first through hole which is on the optical path of the light beam incident upon the deflector so that its central axis is coaxial with the central axis of the cylindrical inner surface drum, (b) a step of providing the scanning head with a drive unit for generating driving force in the subscanning direction, (c) a step of preparing a holder having a second through hole, and freely inserting the holder in the first through hole with the drive unit to be movable in the subscanning direction and coupling the same so that a central axis of the second through hole is coaxial with the central axis of the first through hole, (d) a step of preparing an imaging lens and supporting the lens in the second through hole so that its optical axis is parallel to the central axis of the second through hole, (e) a step of preparing a memory and deciding correspondence relation between each plate thickness which is available for the plate material and a driving quantity of the drive unit attained when the light beam outgoing from the lens is imaged on the exposure surface of the plate material for storing a driving quantity data signal providing each driving quantity as decided in the memory with a plate thickness data signal providing each corresponding plate thickness being regarded as an address signal, (f) a step of mounting the plate material to be exposed on the inner surface and commanding a command signal providing the plate thickness of this plate material as the address signal, and (g) a step of reading the driving quantity data signal corresponding to the plate thickness of the plate material mounted on the inner surface in response to the command signal and applying the driving quantity data signal as read to the drive unit for moving the holder and the lens in the subscanning direction.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
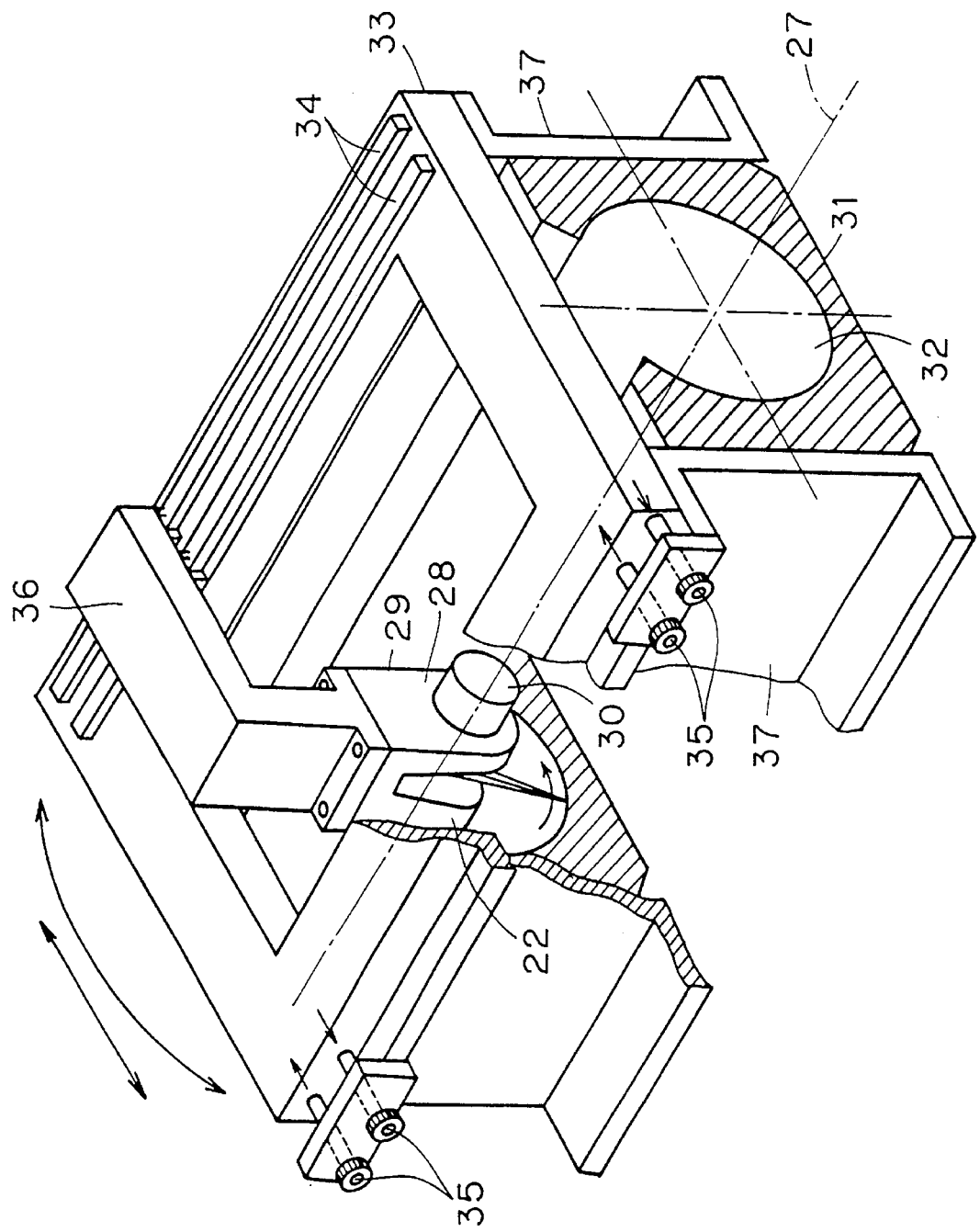
FIG. 1 is a perspective view showing the appearance of a cylindrical inner surface scanner according to an embodiment of the present invention.

FIG. 1 is a perspective view showing the appearance of a cylindrical inner surface scanner according to an embodiment of the present invention. Referring to FIG. 1, a plate material (not shown) is mounted on an inner surface 32 of a cylindrical inner surface drum 31 by vacuum suction or the like. The plate material as employed has a thickness (plate thickness) in a range of about 0.15 mm to 0.3 mm. Typical plate thickness values are 0.2 mm, 0.24 mm, 0.3 mm and the like. Further, a typical example of such a plate material is the so-called PS plate (presensitized plate). In this PS plate, a plate material such as an aluminum plate, a plastic sheet or a paper is previously coated with a photosensitizing solution, to have photosensitivity with respect to visible light of 488 nm and the like in wavelength or infrared light which is oscillated by a laser diode. Available dimensions therefor are over a range of 550 mm by 650 mm at the minimum and 820 mm by 1030 mm at the maximum. Further, two rails 34 are provided on a subscanning base 33 to be parallel to a central axis 27 of the cylindrical inner surface drum 31. The subscanning base 33 is carried on supports 37 which are fixedly provided on side surfaces of the cylindrical inner surface drum 31, through threadingly engaging with adjusting screws 35. Therefore, parallel adjustment of the rails 34 is carried out by slightly moving the subscanning base 33 in its plane through the adjusting screws 35. A direction which is parallel to the central axis 27 is regarded as a subscanning direction.

On the other hand, a scanning head 36 serves as a core of this scanner, and a mounting base 29 which is formed by two base portions 22 and 28 projecting on the central axis 27 to be opposed to each other in the subscanning direction is fixed to an end of this scanning head 36. The base portion 22 is provided with a through hole 22A (see FIGS. 5 and 6) in the subscanning direction, so that a holder 10 (see FIGS. 5 and 6) including an imaging lens and a control mechanism therefor is movably inserted in this through hole 22A, as described later. The other base portion 28 is also provided with a through hole to be coaxial with that of the base portion 22, and a deflector 30 is inserted in this through hole. The deflector 30 has a deflecting surface 30A (see FIG. 3) for reflecting incident light (light beam) from the direction of the central axis 27 to a direction toward the inner surface 32, and comprises a mechanism (not shown) for rotating the deflecting surface 30A about its central axis. Its concrete structure is identical to that disclosed in the aforementioned gazette such as Japanese Patent Laying-Open Gazette No. 5-27190 or 5-5846. Another end of the scanning head 36 is freely engaged with the two rails 34, so that both central axes of the through holes of the base portions 22 and 28 coincide with the central axis 27. The scanning head 36 is moved along the rails 34 in the direction of the central axis 27, i.e., the subscanning direction.

Figure 2:
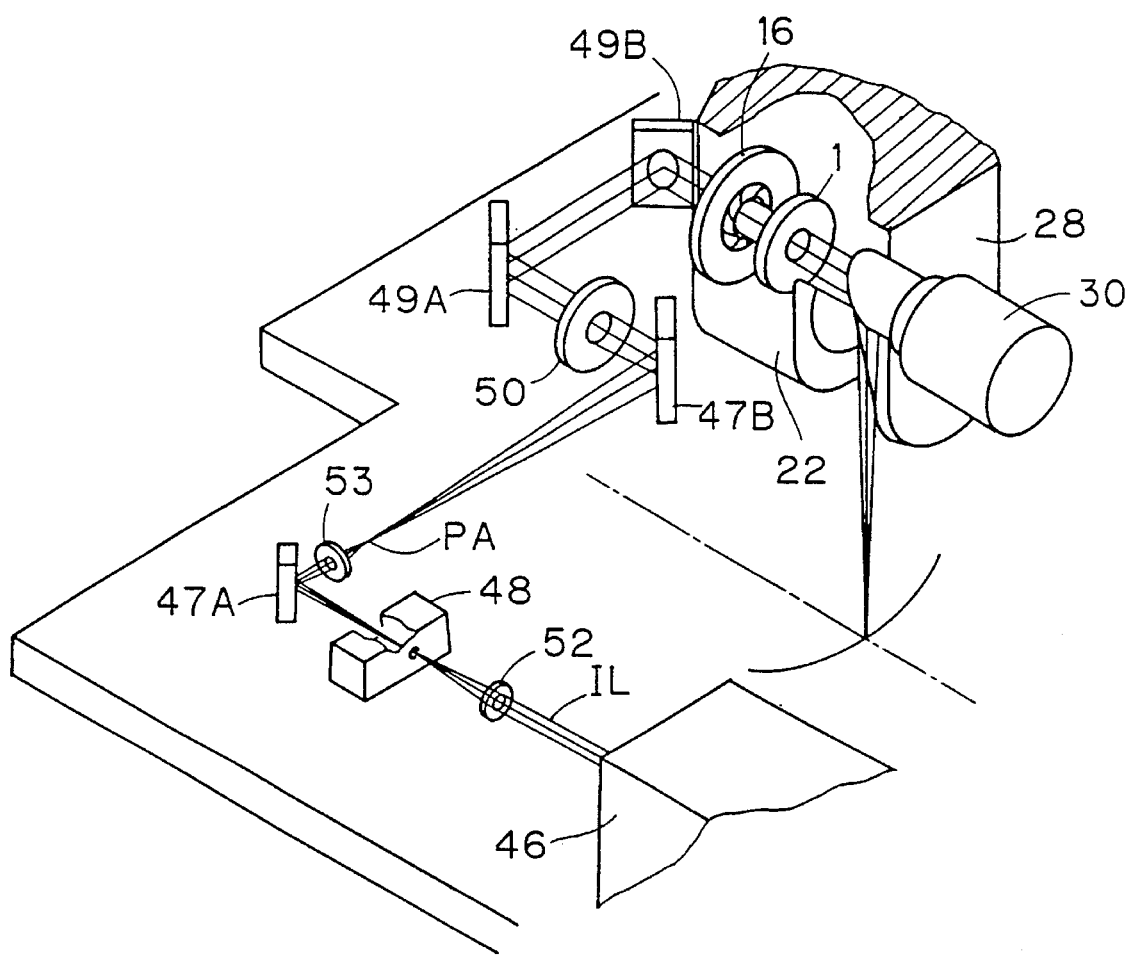
FIG. 2 is a perspective view showing an optical system in the cylindrical inner surface scanner in detail.

FIG. 2 is a perspective view showing the arrangement of the optical system provided in the cylindrical inner surface scanner shown in FIG. 1 in more detail. A light beam (incident light IL) outgoing from a laser beam source 46 is focused in a fine beam diameter by a lens 52, and introduced into a modulator 48 such as an acousto-optical modulator. Thereafter the light beam IL outgoing from the modulator 48 is introduced into a lens 53 through a mirror 47A, to be shaped into a finer beam diameter. A lens 50 having a focal length f is arranged on a position which is separated from a beam waist position PA of the fine beam by a distance f, through a mirror 47B. Thus, the light beam IL is convened to an approximate parallel beam. The parallelled light beam IL is reflected by total reflection mirrors 49A and 49B so that its optical axis (central axis of the beam IL) is in the aforementioned subscanning direction, and introduced into an imaging lens 1 which is provided in the scanning head 36 through an iris (diaphragm) 16. Thus, the beam diameter on the aforementioned position PA is reproduced on a position which is separated from the lens 1 by the focal length f, i.e., a position on the plate material. At this time, a control mechanism provided on the base portion 22 as described later serves an important function.

Figure 3:
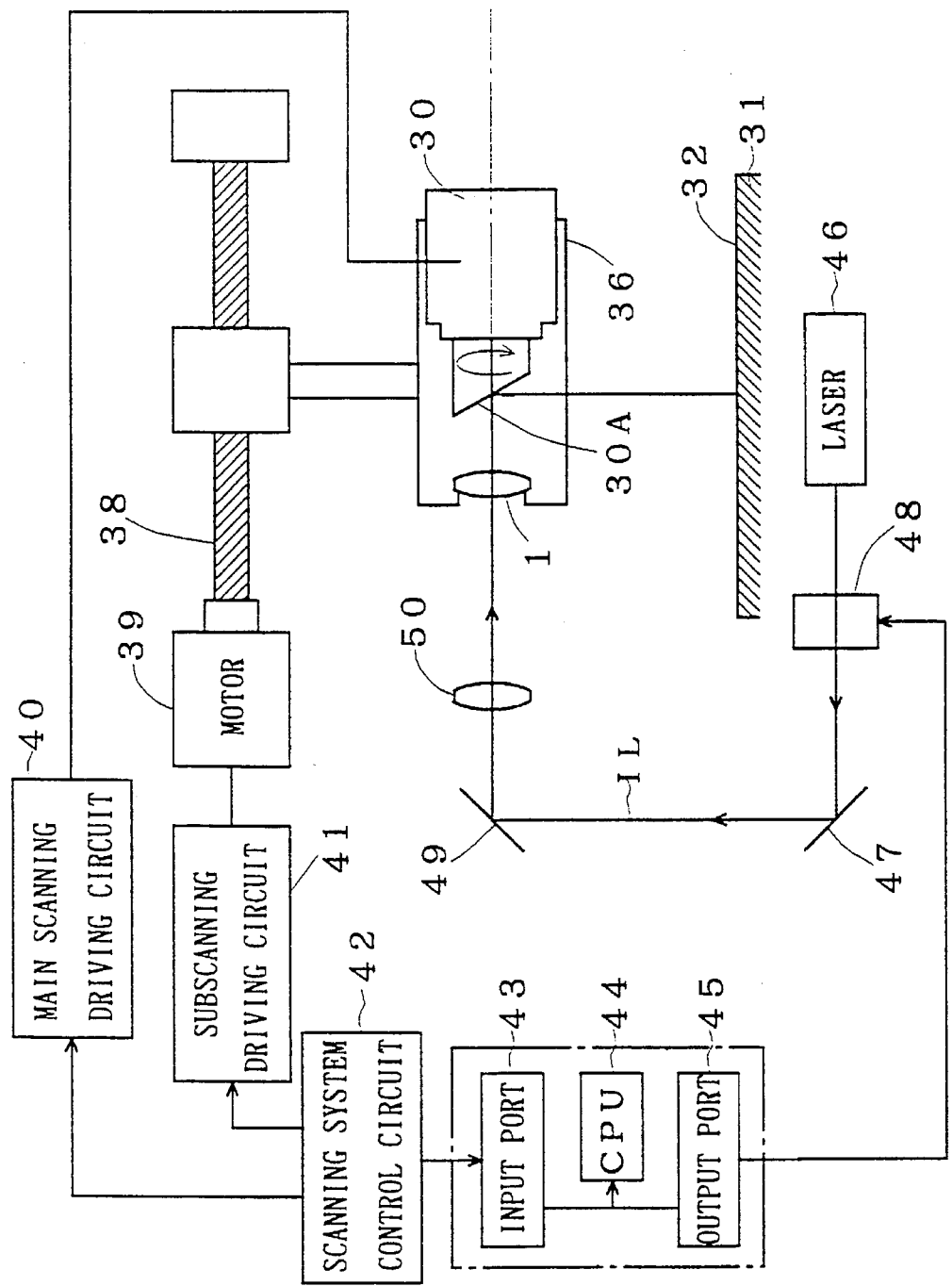
FIG. 3 is a block diagram showing the overall electric system of the cylindrical inner surface scanner.

FIG. 3 is a block diagram showing the electrical structure of the cylindrical inner surface scanner shown in FIGS. 1 and 2. This figure illustrates the structure in the scanning head 36 in a simple manner, for the purpose of convenience. The mirrors 47A and 47B are generically shown as a mirror 47, while the mirrors 49A and 49B are also generically shown as a mirror 49. A portion for supplying driving force to a rotation mechanism for the aforementioned deflector 30 is formed by a main scanning driving circuit 40, and a mechanism portion for driving the scanning head 36 in the subscanning direction is formed by a motor 39 and a ball screw 38, while a driving circuit therefor is formed by a subscanning driving circuit 41. A CPU 44 serves as a general control part for such driving/control systems in the main scanning and subscanning directions, and a scanning system control circuit 42 and an input port 43 are provided between the CPU 44 and the aforementioned portions 40, 41. An output port 45 is provided between the CPU 44 and the modulator 48 as an interface.

Figure 4:
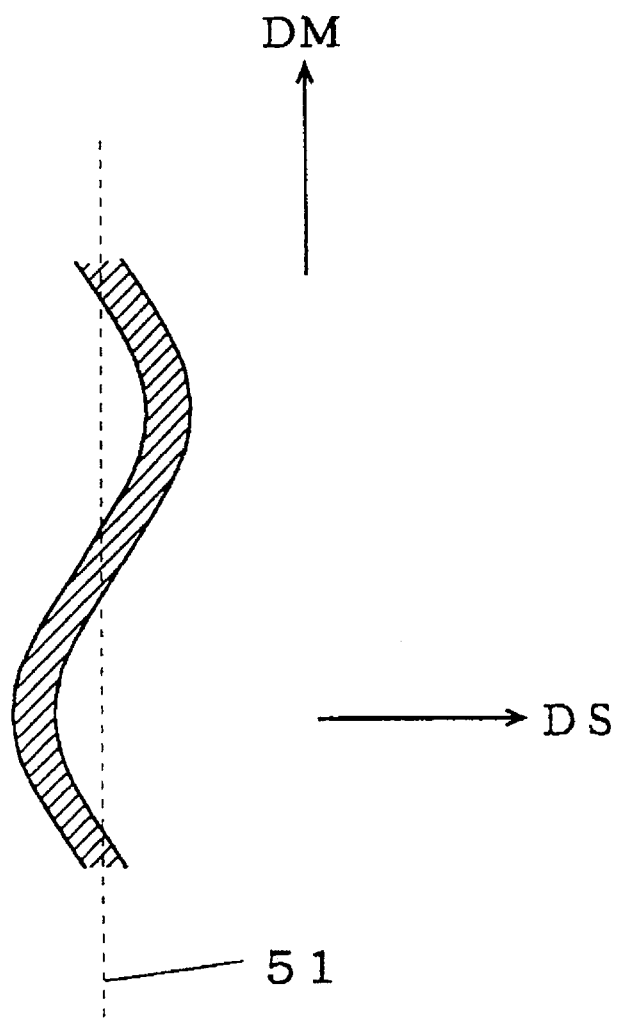
FIG. 4 typically illustrates a BOW phenomenon.

The modulator 48 modulates the incident light IL in response to a modulation signal (image signal or the like) which is outputted from the CPU 44. The modulated incident light IL is thereafter reflected by the mirrors 47 and 49 to be incident upon the lens 1 serving as an imaging lens through the lens 50, as already described above. The lens 1 converges the incident light IL on the plate material (not shown) provided on the inner surface 32, and forms an image. At this time, a BOW phenomenon may take place depending on the arrangement elation between the incident light IL and the lens 1. In such a BOW phenomenon, a scanning line which must be originally formed in parallel with the main scanning direction is disadvantageously bent in the subscanning direction. This phenomenon takes place when the ray direction of the incident light IL deviates from the optical axis of the lens 1, the lens 1 is inclined with respect to the ray direction of the incident light IL, or axial deviation is caused by oblique incidence of the incident light IL upon the lens 1. FIG. 4 shows an exemplary BOW phenomenon. Referring to FIG. 4, numeral 51 denotes an ideal scanning line to be originally formed, and a hatched portion shows a scanning line which is influenced by the BOW phenomenon. Occurrence of such a BOW phenomenon is unpreferable, and this embodiment also has a technique of improving this point.

Figure 5:
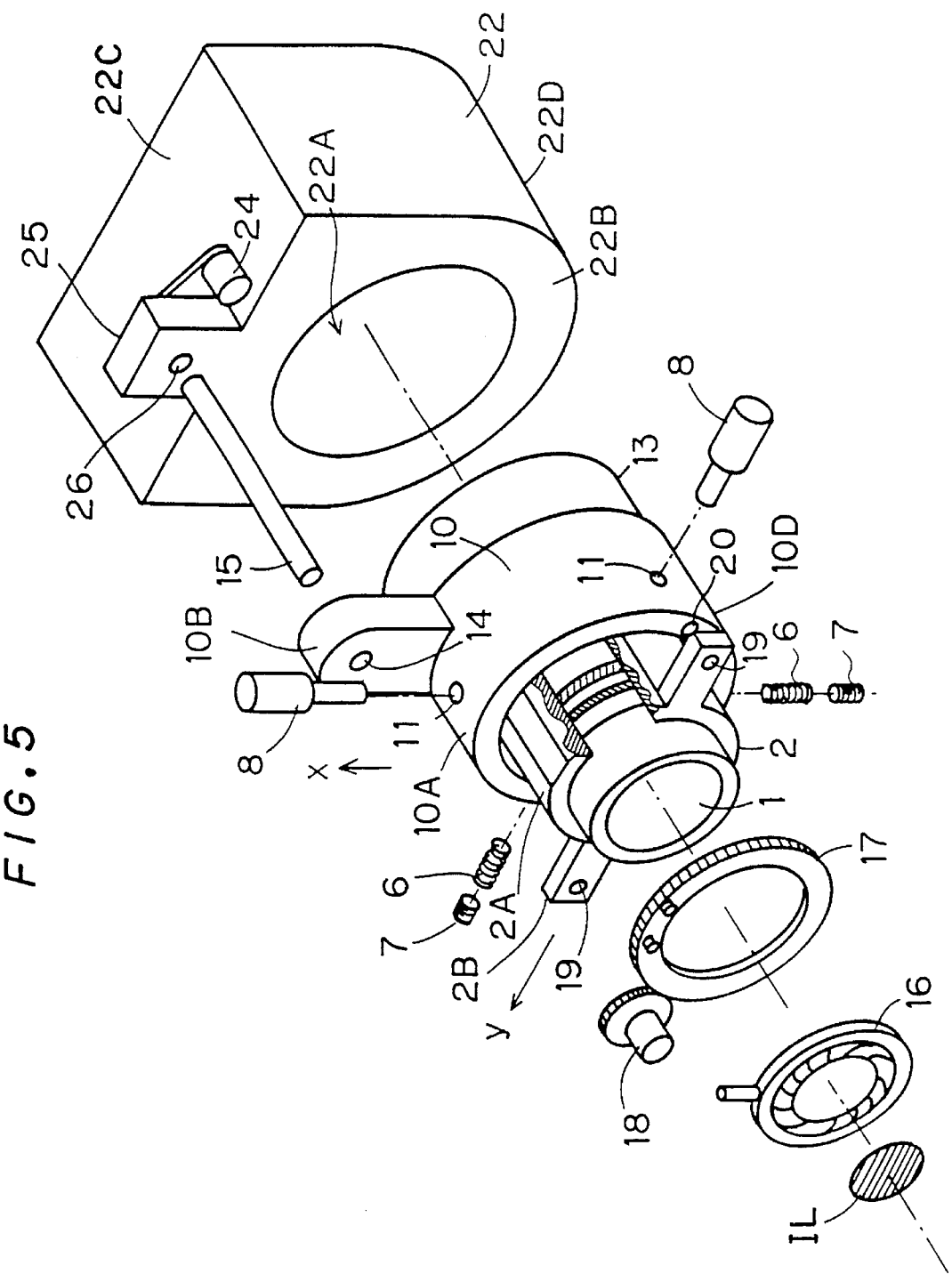
FIG. 5 is a perspective view showing an imaging lens and a control mechanism therefor.
Figure 6:
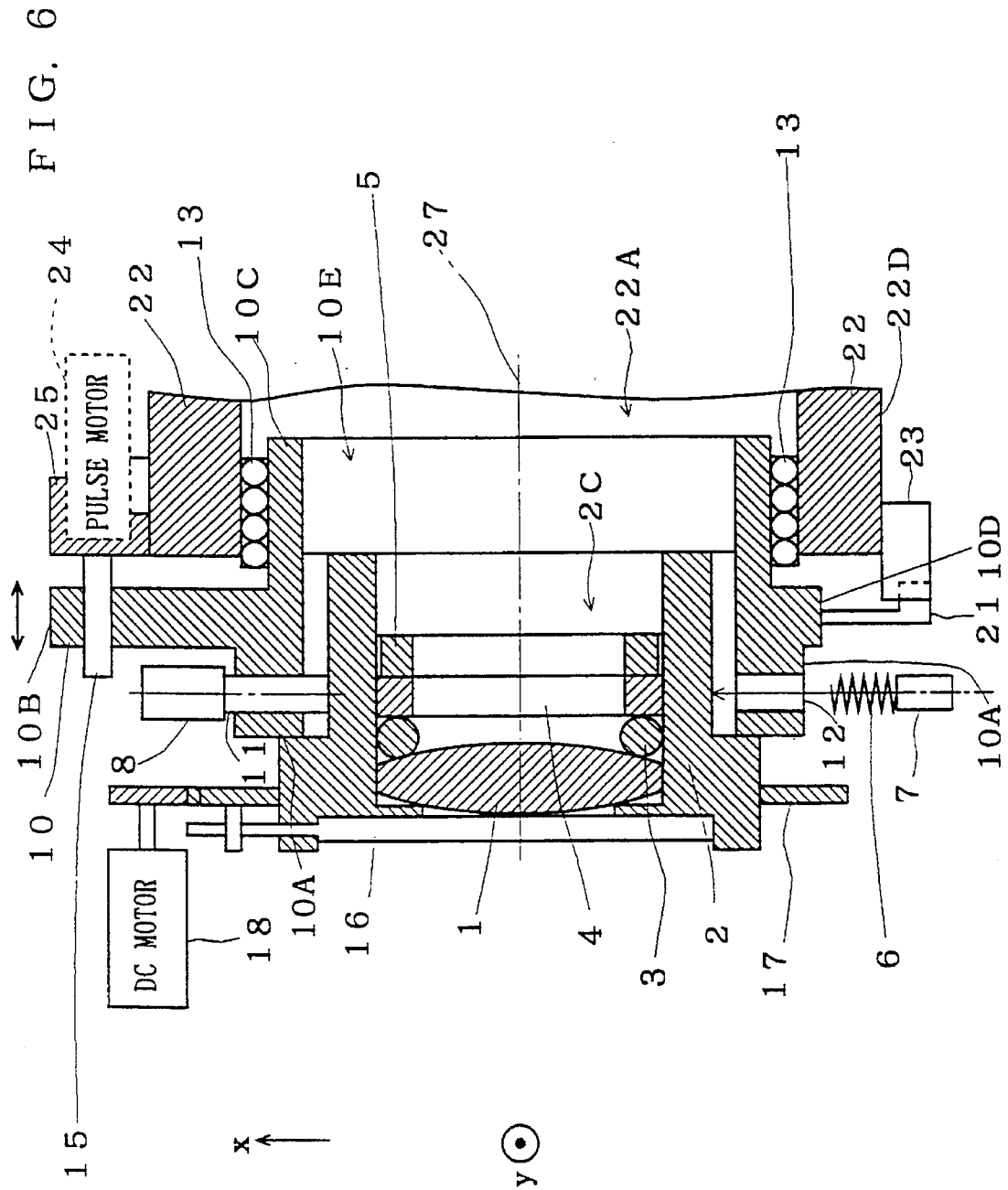
FIG. 6 is a sectional view showing the imaging lens and the control mechanism therefor.

FIGS. 5 and 6 are a perspective view and a sectional view related to a side surface respectively showing the imaging lens 1 and the control mechanism therefor which are principal parts of this embodiment. The base portion 22 is illustrated in these figures to show a mounting state of the control mechanism. The concrete structure of the control mechanism is now described with reference to FIGS. 5 and 6.

The aforementioned through hole 22A in the subscanning direction is provided in the center of the base portion 22. The central axis of this through hole 22A coincides with the central axis 27. A projection 25 is formed on an upper surface 22C at an end portion which is close to an end surface 22B of the base portion 22, and a through hole 26 is formed in the projection 25 for receiving a ball screw 15. Further, a pulse motor 24 is carried on the upper surface 22C. A rotary shaft of this pulse motor 24 is coupled to an end of the ball screw 15 which is inserted in the through hole 26.

Further, an origin sensor 23 (see FIG. 6) is mounted on a lower side surface portion 22D of the base portion 22. This origin sensor 23 detects an origin position which serves as a reference when a holder 10 (described later) is driven by the pulse motor 24, and a schematic structure and a detection principle thereof are shown in FIG. 7.

Figure 7:
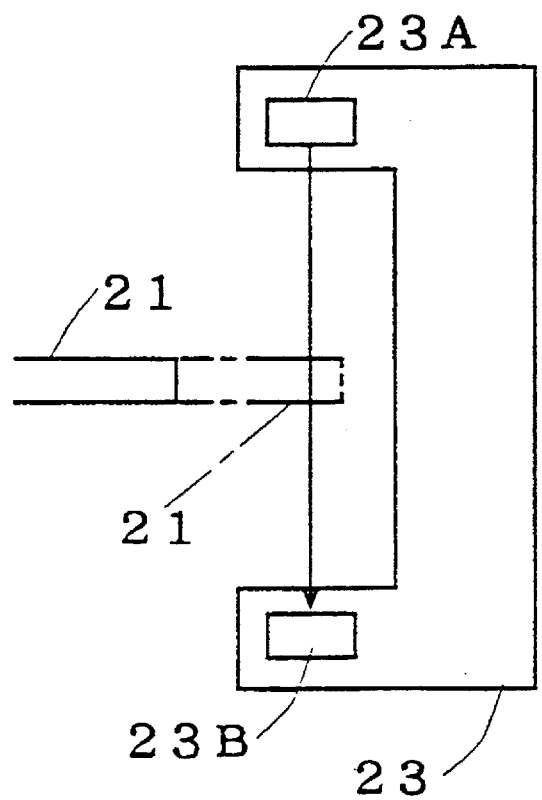
FIG. 7 is a bottom plan view showing the structure of an origin sensor.
Figure 8:
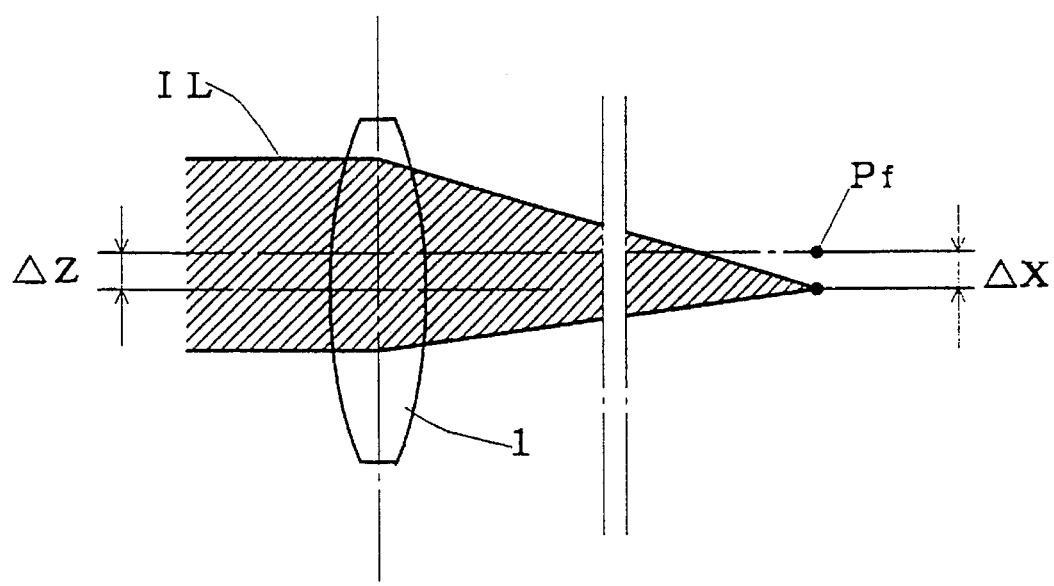
FIG. 8 typically illustrates an imaging position before BOW correction.

FIG. 7 corresponds to a bottom plan view, showing the original sensor 23 as viewed from a+x direction (see FIGS. 5 and 6). A light projector 23A such as a light emitting diode is built in an end of the U-shaped original sensor 23, while a photodetector 23B such as a photodiode is built in another end for detecting light outgoing from the light projector 23A. The photodetector 23B detects a time when a detected plate 21 described later intercepts the light from the light projector 23A (a detection signal goes off in this case), so that the origin sensor 23 detects the aforementioned origin position.

On the other hand, the holder 10, which is a two-stage cylindrical member, is formed by a cylindrical portion 10A having a large outer diameter, a projecting portion 10B (projecting in the +x direction in FIGS. 5 and 6) provided on its side surface, a coaxial cylindrical portion 10C having an outer diameter smaller than that of the cylindrical portion 10A, and a through hole 10E (inner diameters of the cylindrical portions 10A and 10C are identical to each other). On the side surface of the cylindrical portion 10A, screw holes 11 are formed in +x and −y directions as shown in FIG. 5. These screw holes 11 are adapted to mount micrometers 8. Other screw holes 12 are similarly formed on the side surface of the cylindrical portion 10A in −x and +y directions (see FIG. 6). These screw holes 12 are adapted to mount presser springs 6 and spring pressers 7 on the cylindrical portion 10A in this order. The micrometers 8 and the presser springs 6 are employed for controlling the position of the lens 1, in order to correct the aforementioned BOW phenomenon. The x and y directions are perpendicular to each other in a plane which is perpendicular to the central axis 27. A method of correcting the aforementioned BOW phenomenon is described later.

On the other hand, the projecting portion 10B is threadingly engaged with the ball screw 15 through a screw hole 14 provided in this portion 10B. Further, the small-diametral cylindrical portion 10C is freely inserted in a ball guide 13 which is inserted in the through hole 22A of the base portion 22. Thus, the central axis of the through hole 10E of the holder 10 is coaxial with the central axis 27. When the pulse motor 24 is driven, therefore, the driving force is transmitted to the projecting portion 10B of the holder 10 through the ball screw 15, whereby the holder 10 is movable in the ball guide 13 in the direction of the central axis 27 (subscanning direction). Therefore, the detected plate 21 which is fixedly provided on a lower projecting portion 10D of the large-diametral cylindrical portion 10A of the holder 10 is also moved in the direction of the central axis 27 in response to driving of the pulse motor 24. This movement or replacement of the holder 10 is employed for properly aligning an imaging position of the lens 1 on the exposure surface of the plate material in response to the type of the plate material as employed. This point is described later in further detail.

The lens holder 2, which is also a cylindrical member, has projecting portions 2B on its end surface in the +y and -y directions. Through holes 19 are formed in these projecting portions 2B. In a cylindrical side surface portion 2A of the lens holder 2, portions for bringing the micrometers 8 and the presser springs 6 into contact with each other are partially cut to define flat surfaces. The lens holder 2 is mounted on/supported by the holder 10 in the following manner:

First, the cylindrical side surface portion 2A is inserted in the through hole 10E of the holder 10, and the projecting portions 2B are temporarily fixed to the end surface of the holder 10 by screws (not shown) through the aforementioned through holes 19 and screw holes 20 provided in the end surface of the holder 10. The through holes 19 are worked into holes having larger diameters than the screw holes 20 as unloaded holes, so that the lens holder 2 is movable in the x and y directions within the range of the diametral dimensions of the through holes 19.

When the micrometers 8 and the spring pressers 7 which are threadingly engaged with the cylindrical portion 10A of the holder 10 are rotated in a right-hand thread direction, forward ends of the micrometer 8 and the presser springs 6 come into contact with the flat surfaces of the lens holder 2. Thus, the lens holder 2 is mounted on the holder 10 by temporary fixation, whereby the central axis of the through hole 2C of the lens holder 2 is paralleled to the central axis 27.

Thereafter the micrometers 8 are driven to slightly move the lens holder 2 in the x-y plane, for the purpose of BOW correction. The operation of the micrometers 8 is terminated at a point of time when the imaging position of the lens 1 is located on a scanning line in the main scanning direction, and the projecting portions 2B are completely fixed to the end surface of the holder 10 by the aforementioned screws after the completion of the position control. As hereinabove described, the micrometers 8 and the spring pressers 7 form a BOW control mechanism. The operation principle of the BOW control mechanism and a subsequent effect are now described in more detail.

When the micrometer 8 positioned in the x direction is rotated in its right-hand thread direction, the lens holder 2 is shifted in the -x direction by a corresponding amount by a pressing action from the micrometer 8. The lens holder 2 is fixed to/arranged on the shifted position due to an action from the micrometer 8 and the presser spring 6 which is opposed thereto. This also applies to the y direction. Thus, the BOW control mechanism has a degree of (translation) freedom in the two directions x and y, and is fixed in relation to a second direction in adjustment in a first one of the two directions x and y. Thus, it is possible to two-dimensionally position-control the lens 1 by the BOW control mechanism. BOW correction can be readily implemented by employing such a control mechanism. This point is now described with reference to FIGS. 8 to 11. FIGS. 8 to 11 shows the lens 1 as viewed from the -y direction in FIG. 4. Referring to FIGS. 8 to 11, symbol $P_r$ denotes an original imaging position. While the deflecting surface 30A is positioned between the lens 1 and the plate material (not shown) which is mounted on the inner surface 32 as shown in FIG. 3, this positional relation is omitted in FIGS. 8 to 11 for the purpose of convenience.

Figure 9:
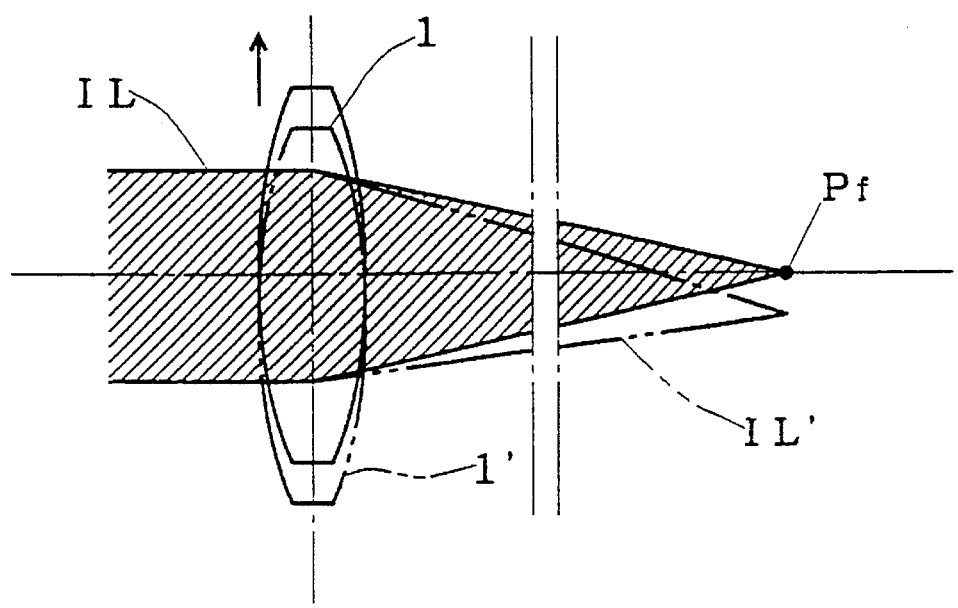
FIG. 9 typically illustrates an imaging position after BOW correction.
Figure 10:
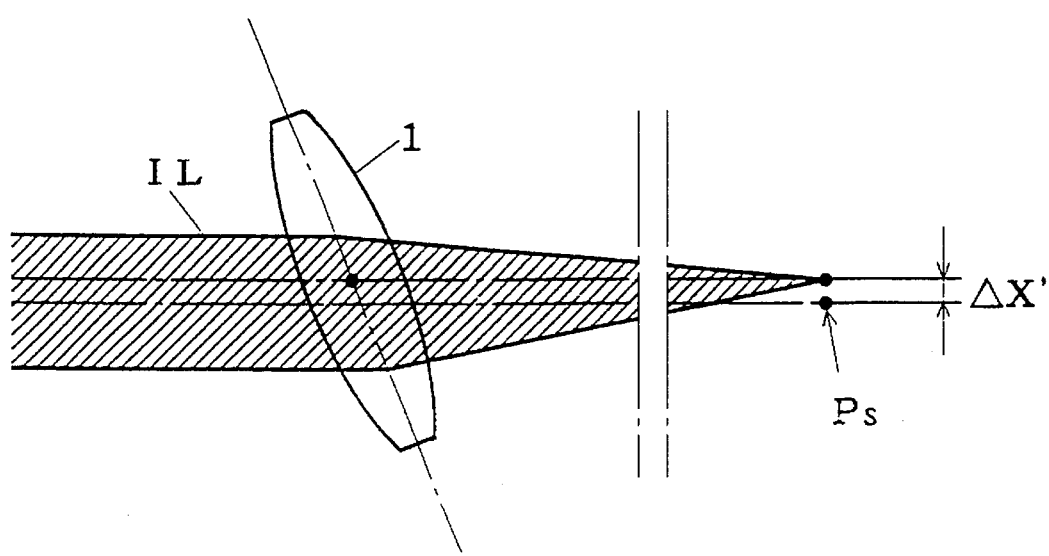
FIG. 10 typically illustrates an imaging position before BOW correction.

Consider that an optical axis direction (central axis direction of luminous flux) of the incident light IL axially deviates from the optical axis of the lens 1 by $\Delta Z$ (FIG. 8) in a parallel manner. At this time, the incident light IL is imaged on a position deviating from the original position on the plate material by an amount of a decentering component $\Delta X$. When the micrometer 8 of the x direction is rotated oppositely to the right-hand thread direction, the lens 1 is moved in the +x direction, whereby it is possible to move/control the imaging position in the opposite direction by the same amount as the decentering component $\Delta x$, thereby correcting the same to the original position. Consequently, the BOW phenomenon is corrected (FIG. 9). Referring to FIG. 9, numeral 1' and symbol IL' denote uncorrected lens and incident light respectively.

Figure 11:
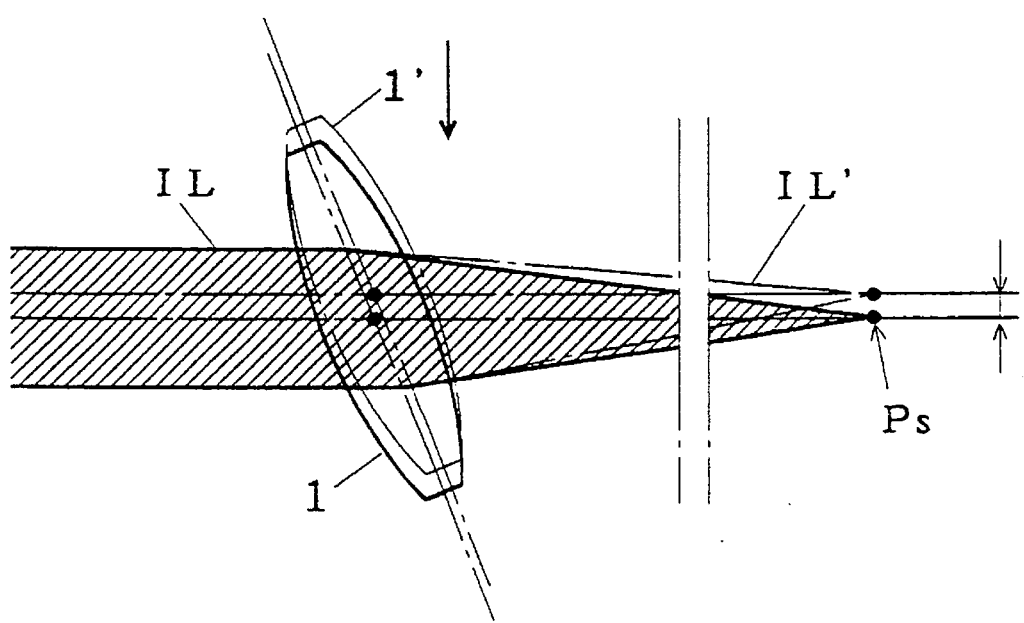
FIG. 11 typically illustrates an imaging position after BOW correction.

If the lens 1 is inclined (FIG. 10), it is possible to similarly correct the imaging position of the incident light IL to the original position by moving the lens 1 in a direction opposite to the direction of misregistration by an amount corresponding to misregistration of a decentering component, $\Delta x'$ caused by such inclination (FIG. 11). Also referring to FIG. 11, numeral 1' and symbol IL' denote uncorrected lens and incident light respectively.

As hereinabove described, it is possible to readily correct every BOW phenomenon by controlling the position of the lens 1 in the two directions x and y. Further, it is possible to precisely carry out the position control due to simple translation of the lens 1. Thus, it is also possible to reduce the control time.

Actual BOW control through the aforementioned control mechanism is now described. First, both micrometers 8 are set at reference positions. This is implemented by previously deciding one of meter values of the micrometers 8 at the value of the reference position. Upon completion of this preparation, the incident light IL is then introduced into the lens 1 to scan the plate material, and a BOW phenomenon of a scanning line thereby implemented is observed.

On the basis of the BOW phenomenon as observed, an operator moves the micrometers 8 from the reference positions to fix the lens 1 to a new position, newly introduces the incident light IL again, and observes the corrected BOW phenomenon. The operator executes the aforementioned control operation until the BOW phenomenon reaches an allowable limit (ideally with no occurrence). At this time, the operator can quantitatively carry out position control of the lens 1 while observing the meter values of the micrometers 8, whereby not only the control operation is simplified but control accuracy can also be improved.

While the control operation is made by the micrometers 8 in this embodiment, screws or the like may alternatively be employed in place of the micrometers 8. In this case, quantitative control can be similarly carried out by counting rotational frequencies of the screws or the like.

The operation of the micrometers 8 is not restricted to a manual operation as in this embodiment, but the micrometers 8 can be electrically automatically adjusted by a driving mechanism such as a pulse motor or an actuator, for example.

On the other hand, the lens 1 is coaxially set in the lens holder 2 in prescribed machining accuracy, as shown in FIG. 6. Namely, the lens 1 is fixed to/arranged in the through hole 2C of the lens holder 2 by a support member which is formed by an O-ring 3, a spacer 4 and a presser spring 5.

Figure 12:
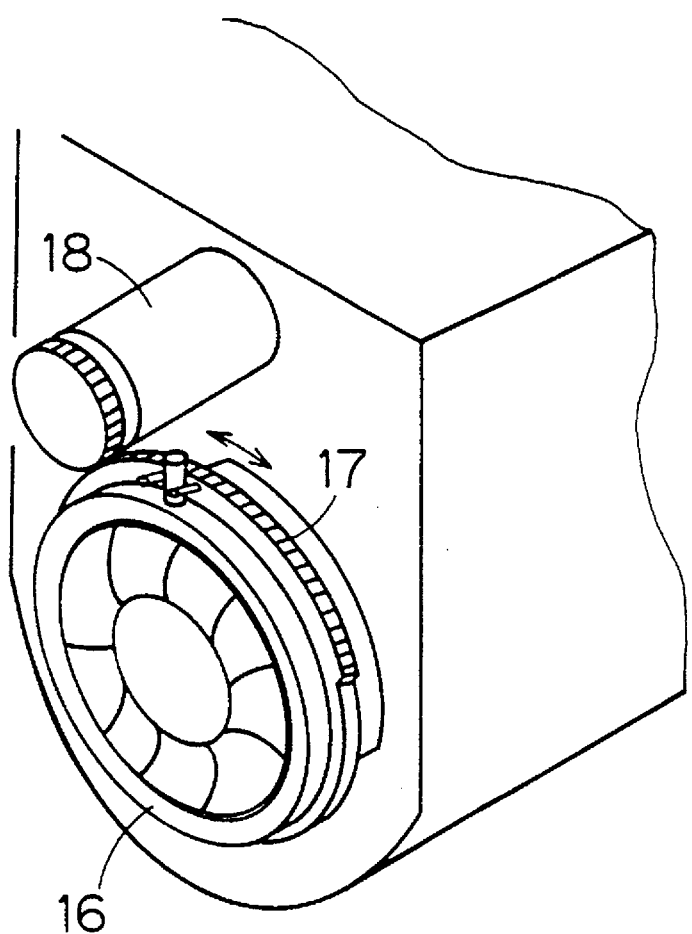
FIG. 12 is a perspective view showing a diaphragm part.

Further, an iris gear 17 is arranged on an incident side end surface of the lens holder 2 including the projecting portions 2B, and an iris (diaphragm) 16 is mounted on the iris gear 17. Further, the iris gear 17 is engaged with a gear of a DC motor 18. A stop diameter of the iris 16 which is adjacent to the incident side of the lens 1 is adjusted by driving force of the DC motor 18 through the iris gear 17. These adjusting mechanisms 16 to 18 are employed for implementing desired resolution. FIG. 12 shows a schematic state attained when these adjusting mechanisms 16 to 18 are mounted on the base portion 22, for reference. While the DC motor 18 is oppositely directed in FIGS. 12 and 6 for convenience of illustration, this will not influence on the essence of the present invention.

Figure 13:
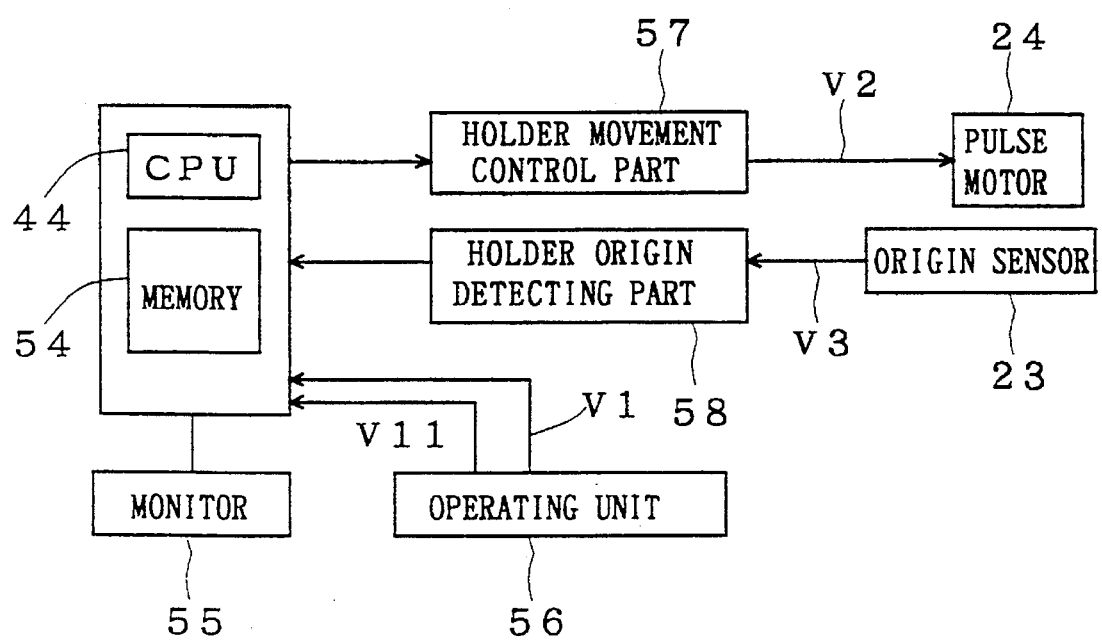
FIG. 13 is a block diagram showing a movement control system for a holder.

FIG. 13 is a block diagram showing a movement control system of the holder 10. Referring to FIG. 13, an operating unit 56 is formed by an input device such as a keyboard or a mouse. When a plate thickness value of a plate material which is currently mounted on the inner surface 32 is inputted by the operator, the unit 56 transmits a command signal commanding the plate thickness value to the CPU 44 as a plate thickness data signal V1. Numeral 55 denotes a monitor.

Figure 14:
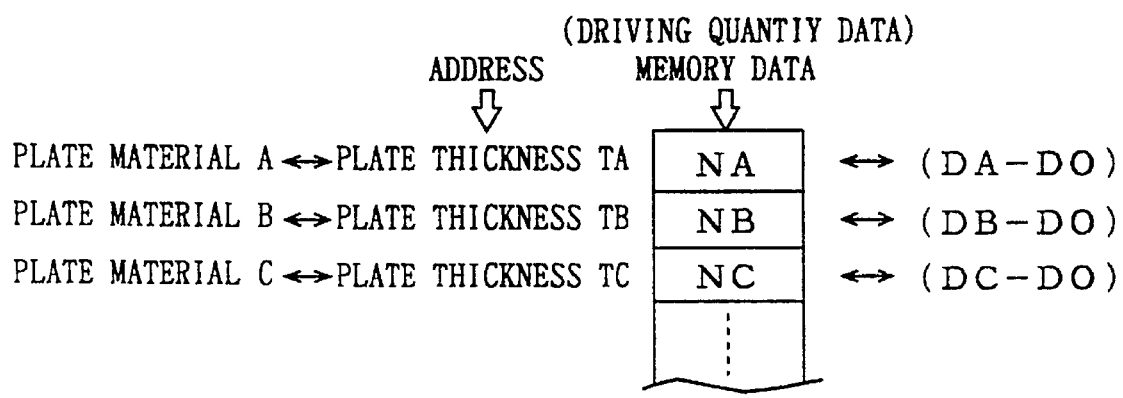
FIG. 14 illustrates data stored in a memory.
Figure 15:
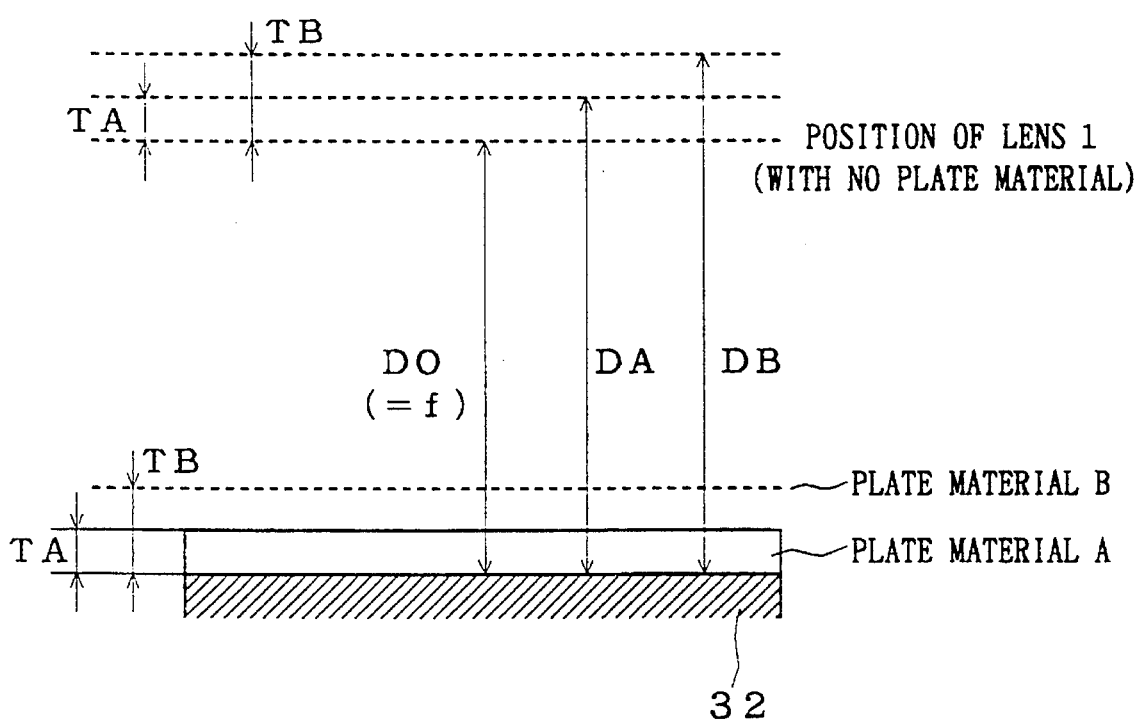
FIG. 15 illustrates meanings of driving quantity data.

A memory 54 holds the plate thickness data signal V1 as an address data signal, and driving quantity data required every plate thickness data as a driving quantity signal. Referring to FIG. 14, for example, the memory 54 stores driving quantity signals providing driving quantity data NA, NB and NC for respective ones of plate thickness data signals V1 providing plate thicknesses TA, TB and TC respectively. Each driving quantity data provides a driving signal (pulse number) for the pulse motor 24 which is necessary for moving the lens 1 when the holder 10 is in the origin position to a position separated from the surface of the currently mounted plate material by the focal length f. This point is further clarified in description with reference to FIG. 15.

When the holder 10 is set at the origin position, the lens 10 is at a position (distance DO) separated from the inner surface 32 by the focal length f. This corresponds to such a case that no plate material is mounted on the inner surface 32. When a plate material A having a plate thickness TA is mounted on the inner surface 32, the lens 1 must be moved to a position which is separated from the inner surface 32 by a distance DA. Namely, it is necessary to generate an amount of rotation corresponding to the distance difference (DA−DO). The driving quantity (pulse number) therefor forms the aforementioned driving quantity data NA. This also applies to a case of employing a plate material B (plate thickness TB) in place of the plate material A. Namely, driving quantity data (pulse number data) NB for supplying an amount of rotation corresponding to the distance difference (DB−DO) is required.

The memory 54 also stores driving quantity data signals providing driving quantities for reversely moving the holder 10 or the lens 1 toward the origin position.

A procedure for moving the holder 10 or the lens 1 to the origin position is carried out as follows: The CPU 44 outputs an origin position movement command signal V11 commanded by the operating unit 56 to the memory 54 as an address data signal, and reads a driving quantity data signal for reversely moving the holder 10 from the memory 54, to output the driving quantity data signal to a holder movement control part 57. The holder movement control part 57 responsively outputs a pulse signal V2 to the pulse motor 24 by the pulse number. A holder origin detecting part 58, detecting a time when a detection signal V3 of the origin sensor 23 enters an OFF state, decides that the holder 10 reaches the origin position, and outputs the result of the decision to the CPU 44. Thus, the CPU 44 stops the output of the aforementioned driving quantity data signal for reversely moving the holder 10, and is set in a state for receiving the aforementioned plate thickness data signal V1. At this time, the holder 10 is located on the origin position, while the lens 1 is also located on a position of the optical path corresponding to the origin position.

Figure 16:
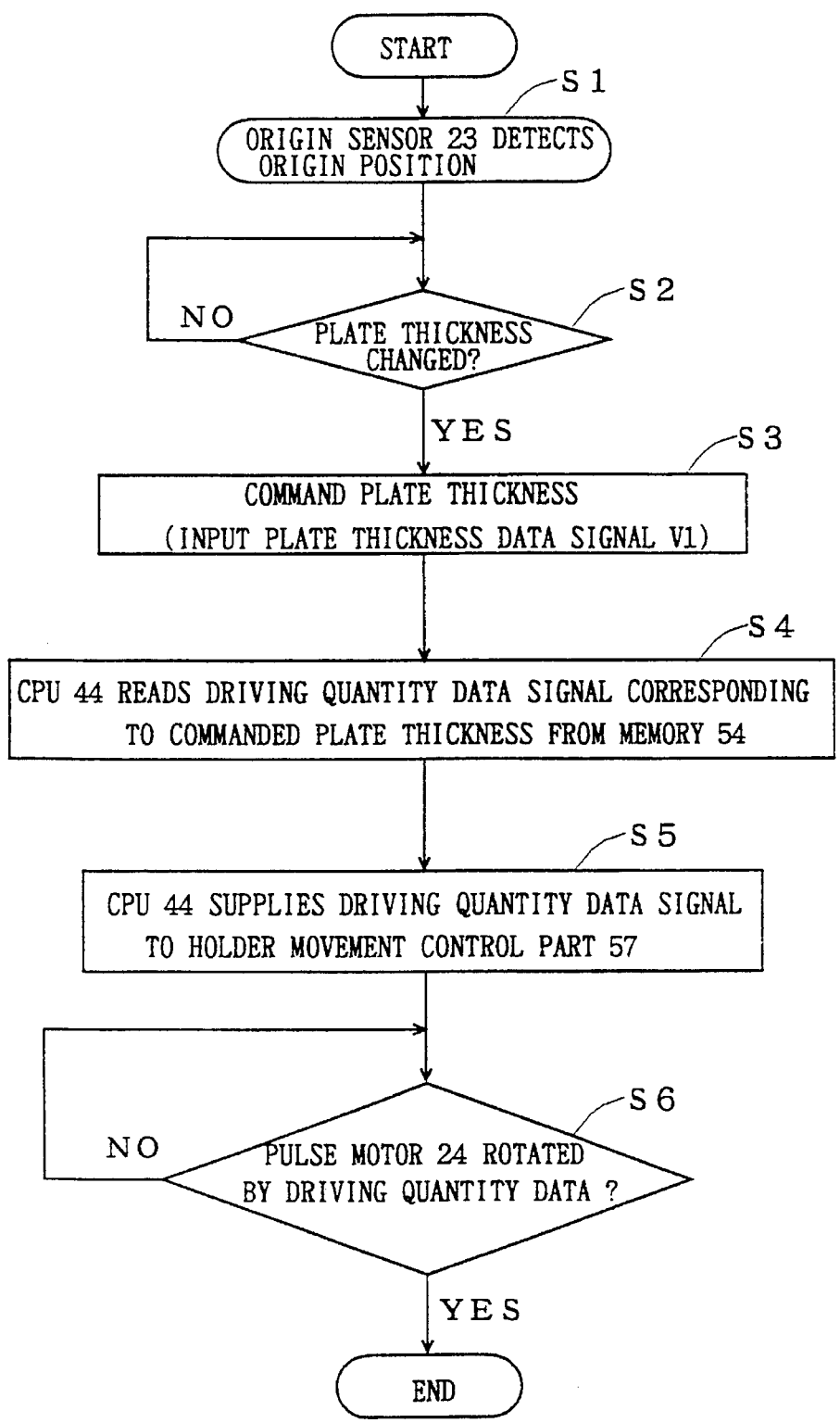
FIG. 16 is a flow chart showing a procedure for controlling an imaging position of a lens.

FIG. 16 is a flow chart showing an imaging position control method for the lens 1 through the control mechanism. It is assumed that the holder 10, the lens holder 2 and the lens 1 are completely arranged on the scanning head 36 and BOW correction is also completed. It is also assumed that the memory 54 shown in FIG. 13 stores the driving quantity data signals in association with the respective plate thickness data signals as shown in FIG. 14. The correspondence between the plate thickness data and the driving quantity data can be decided by previously measuring the relation between the driving quantities (pulse numbers) of the pulse motor 24 and the quantities of movement of the holder 10. It is further assumed that a plate material to be exposed is mounted on the inner surface 32.

Then, the holder 10 is moved to the origin position, as an initial state (step S1). Detection of the origin position is described above. When a plate material having a different plate thickness is newly mounted on the inner surface 32, the operator inputs/commands a new plate thickness data signal V1 through the operating unit 56 (steps S2 and S3). Thus, the CPU 44 reads a driving quantity data signal corresponding to the commanded plate thickness data signal V1 from the memory 54 (step S4), and supplies the driving quantity data signal to the holder movement control part 57 (step S5). Consequently, the pulse motor 24 is rotated by the pulse number indicated by the driving quantity data signal while being controlled by the holder movement control part 57, and stopped (step S6). In response to this, the imaging position of the lens 1 is also changed and the lens 1 is stopped at a position which is separated from an exposure surface of the new plate material by the distance f. Thus, the incident light IL outgoing from the lens 1 is imaged on the exposure surface of the new plate material (the beam waist position of the incident light IL is located on the exposure surface of the plate material).

Figure 17:
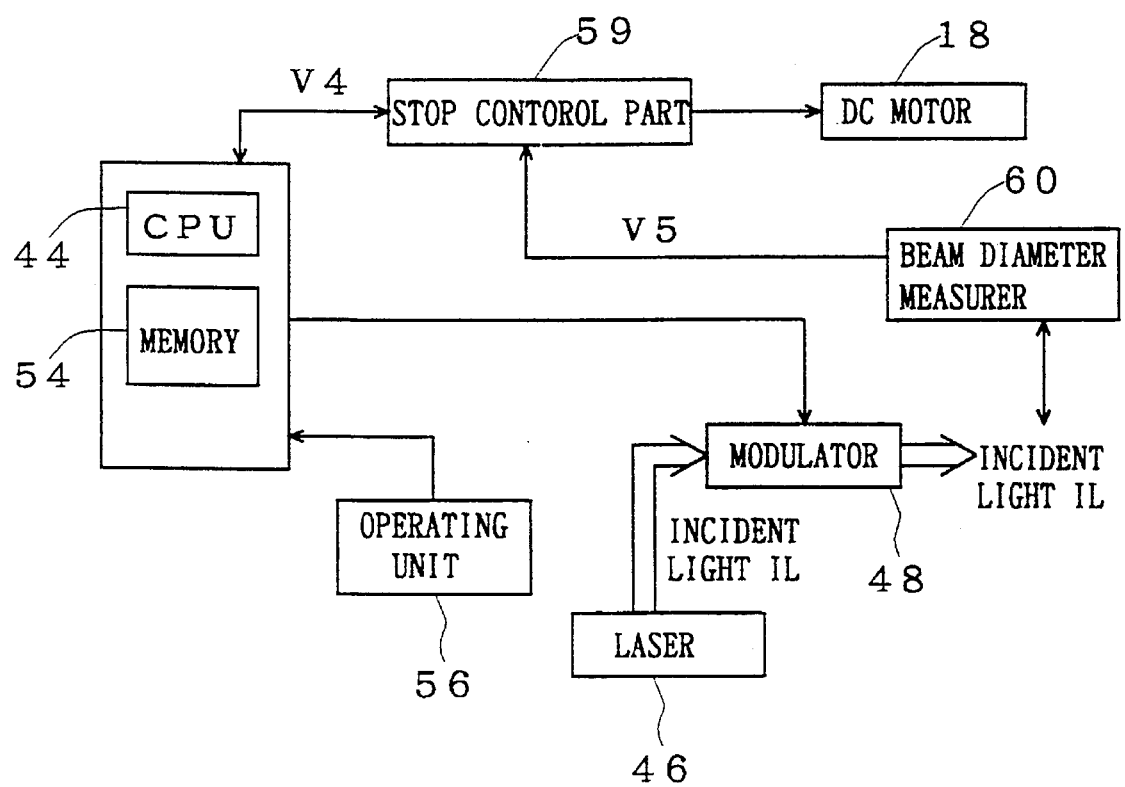
FIG. 17 is a block diagram showing a stop control system.
Figure 18:
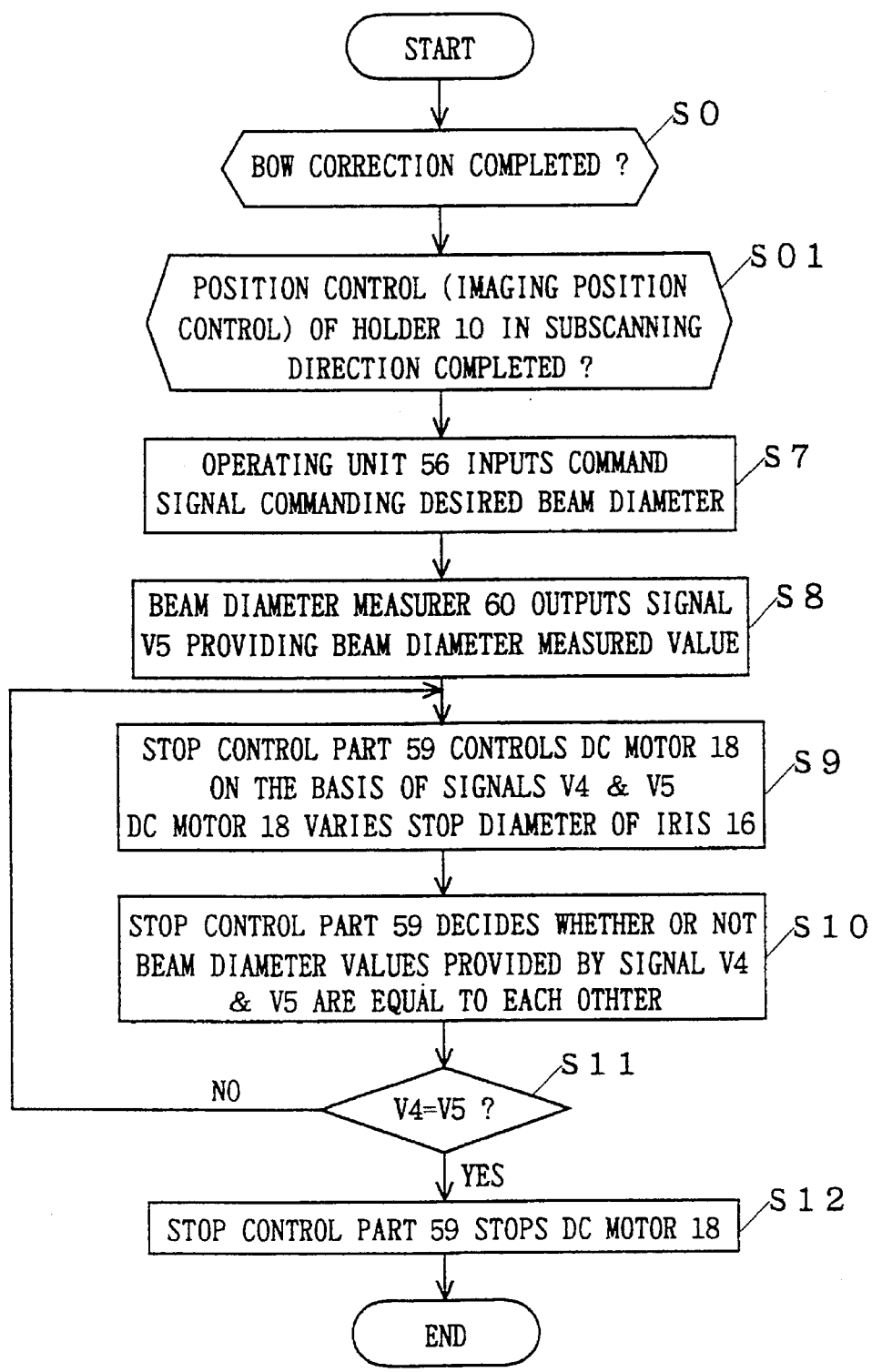
FIG. 18 is a flow chart showing a procedure for electrically controlling the stop diameter.

On the other hand, FIG. 17 is a block diagram showing a stop control system for the iris 16. FIG. 18 is a flow chart showing a stop control procedure. The following description is made with reference to FIGS. 17 and 18. When the aforementioned series of position control of the lens 1 is completed (steps S0 and S01), the iris 16 is stop-controlled in order to attain desired resolution. This is controlled through a desired beam diameter value (this provides desired resolution) which is supplied by the operator to the CPU 44 similarly through the operating unit 56 (step S7) and a beam diameter measured value (this value is measured by a beam diameter measurer 60) of the incident light IL outgoing from the lens 1 (step S8). This control is mainly made by a stop control part 59, which controls rotation of the DC motor 18 on the basis of signals V4 and V5 providing both beam diameter values (step S9). The rotation of the DC motor 18 is transmitted to the iris 16 through the iris gear 17, as already described above. Thus, the stop diameter of the iris 16 is automatically varied, whereby the beam diameter of the incident light IL is also responsively changed by an diffraction effect so that the incident light IL is introduced into the imaging lens 1. Consequently, the beam diameter of the incident light IL for exposing the plate material is also varied. Finally, the stop diameter of the iris 16 is adjusted to/set at a proper stop diameter providing desired resolution (i.e., desired beam diameter) (steps S10, S11 and S12).

Figure 19:
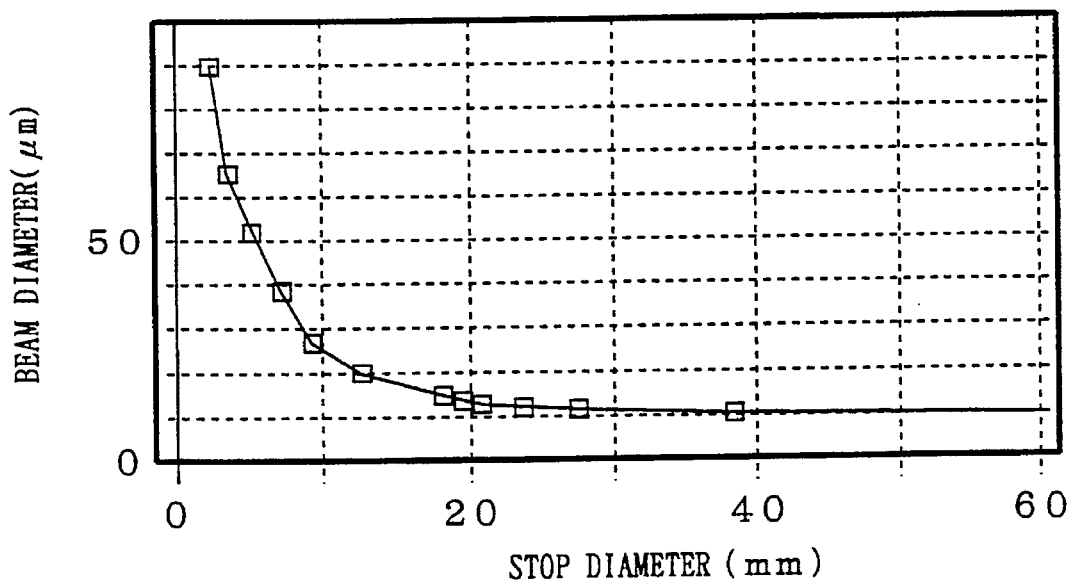
FIG. 19 illustrates relations between stop diameters and beam diameters.
Figure 20:
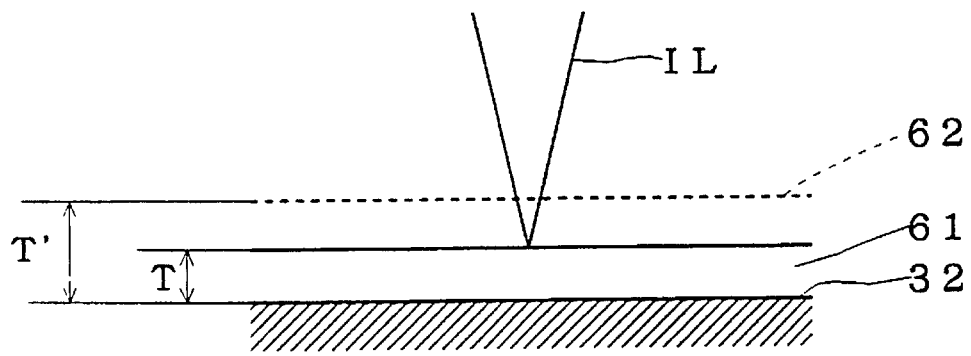
FIG. 20 is a diagram for pointing out problems of the prior art.

FIG. 19 shows relations between stop diameters and beam diameters in exposure. The iris 16 may be adjacently arranged not on the incident optical path side of the lens 1, but on an outgoing optical path side of the lens 1.

According to this embodiment, as hereinabove described, the pulse motor serving as driving means moves the holder in the subscanning direction in response to the plate thickness of the actually mounted plate material while also moving the lens which is coaxially supported in the holder in synchronization by the equal amount of displacement. Thus, it is possible to regularly image the light beam on the exposure surface of the plate material according to this embodiment.

According to this embodiment, the stop diameter of the diaphragm which is adjacent to the imaging lens is made electrically controllable, whereby the beam diameter of the light beam which is imaged on the exposure surface of the plate material can be brought into an optimum level in response to desired resolution.

While the invention has been shown and described in detail, the foregoing description is in all aspects illustrative and not restrictive. It is therefore understood that numerous modifications and variations can be devised without departing from the scope of the invention.

What is claimed is:

1. A cylindrical inner surface scanner for scanning a plate material being mounted on an inner surface of a cylindrical surface drum having a hollow shape provided with a cylindrical inner surface in a main scanning direction with a light beam being incident upon said cylindrical inner surface drum by a deflector mounted on a scanning head movable in a subscanning direction being parallel to a central axis of said cylindrical inner surface drum for exposing said plate material, thereby producing a printing plate, said cylindrical inner surface scanner comprising:

means (a) for inputting a command signal indicating thickness of said plate material being actually mounted on said inner surface; and means (b) being arranged on an optical path of said light beam being incident upon said deflector and movable in said subscanning direction integrally with said deflector, for imaging said incident light beam on an exposure surface of said plate material on the basis of said command signal;

said means (b) comprising means (b-1) to receive said command signal for generating a control signal providing a driving quantity that is required for positioning an image of said light beam on said exposure surface of said plate material, and means (b-2) arranged on said scanning head and comprising:
a lens (b-2-1) for focusing said light beam on said exposure surface of said plate material,
a holder (b-2-2) for holding said lens, and
driving means (b-2-3) which upon receiving said control signal, generates a driving force in the subscanning direction to be applied to said holder and thereby images said light beam on said exposure surface of said plate material.

2. A cylindrical inner surface scanner in accordance with claim 1, wherein said scanning head includes a first through hole positioned on said optical path and having a central axis that is parallel to said subscanning direction;

said holder (b-2-2) being arranged in said first through hole to be displaceable in said subscanning direction and being provided with a second through hole having a central axis that is coaxial with said central axis of said first through hole, and said lens being arranged in said second through hole.

3. A cylindrical inner surface scanner in accordance with claim 2, wherein said means (b-1) comprises:
memory means (b-1-1) for storing each of said driving quantities previously decided for every plate thickness of said plate material as a driving quantity signal while associating the same with a data signal providing said each plate thickness, and
means (b-1-2) that receives said command signal for reading said driving quantity signal corresponding to said command signal from said memory means and outputting said driving quantity signal as being read to said driving means as said control signal.

4. A cylindrical inner surface scanner in accordance with claim 3, further comprising:

means (c) arranged on said scanning head for detecting an origin position which is a position of said holder and said lens on said optical path in imaging of said light beam on said inner surface, said driving quantity corresponding to a quantity required for displacing said holder and said lens from said origin position to a position on said optical path for positioning said image on said exposure surface of said plate material, said means (b-1) further comprising
means (b-1-3) for generating an origin position control signal for moving said holder and said lens toward said origin position, and said means (b-2) further comprising
means (b-2-4) for controlling said driving means on the basis of said origin position control signal and a detection signal being outputted from said means (c), thereby moving said holder and said lens to said origin position.

5. A cylindrical inner surface scanner in accordance with claim 4, wherein said holder has a detected portion that is displaced in said subscanning direction with said holder, said means (c) having a light emitting element and a photodetector for detecting light being emitted from said light emitting element, said means (c) detecting said origin position when said detected position intercepts incidence of said light being emitted from said light emitting element on said photodetector by said displacement in said subscanning surface.

6. A cylindrical inner surface scanner in accordance with claim 2, further comprising:

input means for inputting an input signal commanding a beam diameter of said light beam on said exposure surface of said plate material, said means (b-2) further comprising:

diaphragm means being arranged on a position of said optical path being adjacent to said lens, for varying its stop diameter to implement said commanded beam diameter on the basis of said input signal.

7. A cylindrical inner surface scanner in accordance with claim 6, wherein said diaphragm means is arranged on said holder on said optical path of said light beam being incident upon said lens.

8. A cylindrical inner surface scanner in accordance with claim 2, wherein said holder comprises control means for moving said lens in a plane being perpendicular to said subscanning direction.

9. A cylindrical inner surface scanner in accordance with claim 8, wherein said holder comprises:

a first holder, provided with a side surface being partially arranged in said through hole of said scanning head, and having said second through hole, said control means being arranged on a side surface portion of said side surface of said first holder projecting beyond said first through hole and movable through said side surface portion toward said central axis of said first through hole, and a second holder being arranged in said first through hole through said control means and provided with another through hole so that its central axis is parallel to said central axis of said first through hole, said lens being supported in said another through hole.

* * * * *